(12) United States Patent
Jeong et al.

(10) Patent No.: US 11,021,079 B2
(45) Date of Patent: Jun. 1, 2021

(54) VEHICLE AND METHOD OF CONTROLLING THE SAME

(71) Applicants: Hyundai Motor Company, Seoul (KR); Kia Motors Corporation, Seoul (KR)

(72) Inventors: Donghyuk Jeong, Gyeonggi-do (KR); Singu Kim, Gyeonggi-do (KR); Ki Seon Ryu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 16/667,328

(22) Filed: Oct. 29, 2019

(65) Prior Publication Data

US 2020/0339008 A1    Oct. 29, 2020

(30) Foreign Application Priority Data

Apr. 29, 2019    (KR) .................. 10-2019-0049576

(51) Int. Cl.
*B60L 1/00*    (2006.01)
*B60L 3/00*    (2019.01)
(Continued)

(52) U.S. Cl.
CPC .............. *B60L 58/18* (2019.02); *B60L 53/62* (2019.02); *B60W 10/06* (2013.01); *B60W 10/08* (2013.01); *B60W 20/13* (2016.01); *H01M 10/0525* (2013.01); *H01M 10/06* (2013.01); *H04N 5/23241* (2013.01); *H04N 5/23245* (2013.01); *B60Y 2200/92* (2013.01); *B60Y 2300/00* (2013.01); *H01M 2220/20* (2013.01)

(58) Field of Classification Search
CPC .. B60L 58/18; B60L 53/62; B60L 1/00; B60L 2240/545; B60L 2240/547; B60L 2240/549; B60L 58/20; B60L 58/13; B60W 20/13; B60W 10/06; B60W 10/08; H04N 5/23245; H04N 5/23241; H04N 5/772; H04N 5/232; H01M 10/0525; H01M 10/06; H01M 2220/20; B60Y 2200/92; B60Y 2300/00; Y02E 60/10; B60R 16/03
USPC ....................................................... 307/10.1
See application file for complete search history.

(56) References Cited

U.S. PATENT DOCUMENTS 10,807,547 B2 * 10/2020 Obayashi ............ F02D 41/0007
2016/0137092 A1 * 5/2016 Thieme .................. B60L 1/003
307/10.6

* cited by examiner

*Primary Examiner* — Richard Tan
(74) *Attorney, Agent, or Firm* — Mintz Levin Cohn Ferris Glovsky and Popeo, P.C.; Peter F. Corless

(57) ABSTRACT

A vehicle is provided to execute different modes based on a start signal. A parking-video recording mode is executed by turning on a first switch connected to a first battery to supply electric power of the first battery to a video recording device, identifying a charging amount of the first battery, turning on a third switch connected to a second battery to supply electric power of the second battery to the video recording device when the identified charging amount is less than a first reference charging amount, identifying a charging amount of the second battery, and terminating the parking-video recording mode when the identified charging amount of the second battery is less than a second reference charging amount. A traveling-video recording mode is executed by turning on a second switch connected to a generator to supply electric power generated by the generator to the video recording device.

20 Claims, 8 Drawing Sheets

(51) Int. Cl.
  *H02G 3/00*     (2006.01)
  *B60L 58/18*    (2019.01)
  *B60W 20/13*    (2016.01)
  *B60L 53/62*    (2019.01)
  *B60W 10/06*    (2006.01)
  *B60W 10/08*    (2006.01)
  *H04N 5/232*    (2006.01)
  *H01M 10/0525*  (2010.01)
  *H01M 10/06*    (2006.01)

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2019-0049576, filed on Apr. 29, 2019, the disclosure of which is incorporated herein by reference.

BACKGROUND

1. Field of the Disclosure

The present disclosure relates to a vehicle for supplying power to a video recording device configured to acquire and store a video, and a method of controlling the same.

2. Description of the Related Art

A vehicle refers to a transportation device that moves on a road by driving vehicle wheels, and the vehicle requires power for the movement. A vehicle is divided into an internal combustion engine vehicle and an eco-friendly vehicle according to the power source. In particular, the internal combustion engine vehicle is a vehicle that controls the starting thereof using a battery, and when the starting is completed, generates mechanical power by burning petroleum fuels, such as gasoline and light oil, and travels using the mechanical power. The eco-friendly vehicle is a vehicle that travels on electricity of a battery to improve the fuel efficiency and reduce toxic gas emissions.

The eco-friendly vehicle includes: an electric vehicle having a battery, which is a rechargeable power unit and a motor which rotates using the electricity accumulated in the battery and the vehicle wheels are operated using the rotation of the motor; and a hybrid vehicle having an engine, a battery, and a motor and travels by adjusting the mechanical power of the engine and the electric power of the motor.

The vehicle includes a battery that supplies electric power for starting the vehicle or a battery that supplies electric power for starting the vehicle and power for traveling. In addition, the battery for supplying electric power for starting may also supply electric power for driving various electronic devices provided within the vehicle. Accordingly, the battery when turn-off is discharged by dark current flowing to various electronic devices in the vehicle, and when the amount of discharge increases so that the charging amount of the battery is lowered to a reference charging amount or below with elapse of the turn-off time, the vehicle is unable to be turned on.

SUMMARY

Therefore, the present disclosure provides a vehicle having a battery that supplies electric power to a video recording device when the vehicle parked or stopped, and a method of controlling the same.

It is another object of the disclosure to provide a vehicle that supplies electric power of a battery for starting the vehicle to a video recording device when a battery for supplying electric power to the video recording device has a charging amount less than or equal to a reference charging amount when of the vehicle parked and stopped, and a method of controlling the same. Additional aspects of the disclosure will be set forth in part in the description which follows and, in part, will be obvious from the description, or may be learned by practice of the disclosure.

According to an aspect of the present invention, a vehicle may include: a video recording device; a first battery connected to the video recording device; a second battery for starting an engine; a generator configured to generate electric power using rotary power of the engine; a switch unit having a first switch connected to the first battery and a second switch connected to the generator; and a controller configured to, in response to receiving a start-off signal, operate the first switch to be turned on to supply electric power of the first battery to the video recording device, and in response to receiving a start-on signal, operate the second switch to be turned on to supply electric power generated by the generator to the video recording device, and execute charging of the first and second batteries using electric power generated by the generator.

The first battery may be a lithium-based battery and the second battery is a lead acid-based battery. The controller may be configured to count a time from a reception time of the start-off signal, and operate the first switch to be turned off when the counted time passes a setting time. While the first switch is in an on-state, the controller may be configured to identify a charging amount of the first battery, and operate the first switch to be turned off when the identified charging amount of the first battery is less than or equal to a reference charging amount. In a start-on state, the controller may allow electric power of the second battery to be supplied to the video recording device when an amount of electric power generated by the generator is less than or equal to a reference amount of electric power.

According to another aspect of the present invention, a vehicle may include: a video recording device; a first battery connected to the video recording device; a second battery configured to start an engine; a generator configured to generate electric power using rotary power of the engine; a switch unit having a first switch connected to the first battery, a second switch connected to the generator, and a third switch connected to the second battery; and a controller configured to, in response to receiving a start-off signal, execute a parking-video recording mode, operate the first switch to be turned on to supply electric power of the first battery to the video recording device during the performance of the parking-video recording mode, and operate the third switch to be turned on to supply electric power of the second battery to the video recording device when a charging amount of the first battery is less than or equal to a first reference charging amount, and in response to receiving a starting—on signal, terminate the parking-video recording mode and perform a traveling-video recording mode and operate the second switch to be turned on to supply electric power generated by the generator to the video recording device during the performance of the traveling-video recording mode.

The first battery may be a lithium-based battery and the second battery may be a lead acid-based battery. The controller, while the first switch is in an on-state, may be configured to count a time from a reception time of the start-off signal, and operate the first switch to be turned off when the counted time passes a setting time. While the third switch is in an on-state, the controller may be configured to count a time from a reception time of the start-off signal, and operate the third switch to be turned off when the counted time passes a predetermined second time.

The controller, in response to receiving a start-on signal, may be configured to operate the second switch to be turned on to supply electric power generated by the generator to the video recording device, and execute charging of the first and second batteries using electric power generated by the generator. While the third switch is in an on-state, the controller may be configured to terminate the parking-video recording mode when a charging amount of the second battery is less than or equal to a second reference charging amount.

According to another aspect of the present invention, a vehicle may include: an video recording device; a first battery connected to the video recording device; a second battery configured to supply electric power to a plurality of electronic devices; a switch unit having a first switch connected to the first battery and a fourth switch connected to the second battery; and a controller configured to, in response to receiving a key-off signal, execute a parking-video recording mode, operate the first switch to be turned on to supply electric power of the first battery to the video recording device during the performance of the parking-video recording mode, and operate the fourth switch to be turned on to supply electric power of the second battery to the video recording device when a charging amount of the first battery is less than or equal to a first reference charging amount.

The vehicle may further include a third battery configured to supply electric power to a driving-purpose motor for rotating vehicle wheels, wherein the controller, in response to receiving a key-on signal, may be configured to terminate the parking-video recording mode and execute a traveling-video recording mode, and supply electric power of the third battery to the first and second batteries to charge the first and second batteries during the performance of the traveling-video recording mode.

The controller, while the first switch is in an on-state, may be configured to count a time from a reception time of the key-off signal, and operate the first switch to be turned off when the counted time passes a first setting time. The controller, while the fourth switch is in an on-state, may be configured to count a time from a reception time of the start-off signal, and operate the fourth switch to be turned off when the counted time passes a second setting time.

The controller, in response to receiving a key-on signal, may be configured to terminate the parking-video recording mode and execute a traveling-video recording mode, and operate the fourth switch to be turned on to supply electric power of the second battery to the video recording device. The controller, while the fourth switch is in an on-state, may be configured to terminate the parking-video recording mode when a charging amount of the second battery is less than or equal to a second reference charging amount.

According to another aspect of the present invention, a method of controlling a vehicle may include: executing, in response to receiving a start-off signal, a parking-video recording mode; and executing, in response to receiving a start-on signal, a traveling-video recording mode. The executing of the parking-video recording mode may include: operating a first switch connected to a first battery to be turned on to supply electric power of the first battery to an video recording device; identifying a charging amount of the first battery; operating a third switch connected to a second battery to be turned on to supply electric power of the second battery to the video recording device when the identified charging amount of the first battery is less than a first reference charging amount; identifying a charging amount of the second battery; and terminating the parking-video recording mode when the identified charging amount of the second battery is less than a second reference charging amount. The executing of the traveling-video recording mode may include operating a second switch connected to a generator to be turned on to supply electric power generated by the generator to the video recording device.

The executing of the parking-video recording mode may include: counting, while the first switch is in an on-state, a time from a reception time of the key-off signal, and operating the first switch to be turned off when the counted time passes a first setting time; and counting, while the third switch is in an on-state, a time from a reception time of the key-off signal, and operating the third switch to be turned off when the counted time passes a second setting time. The method may further include, in response to receiving the start-on signal, executing charging of the first and second batteries using electric power generated by the generator.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
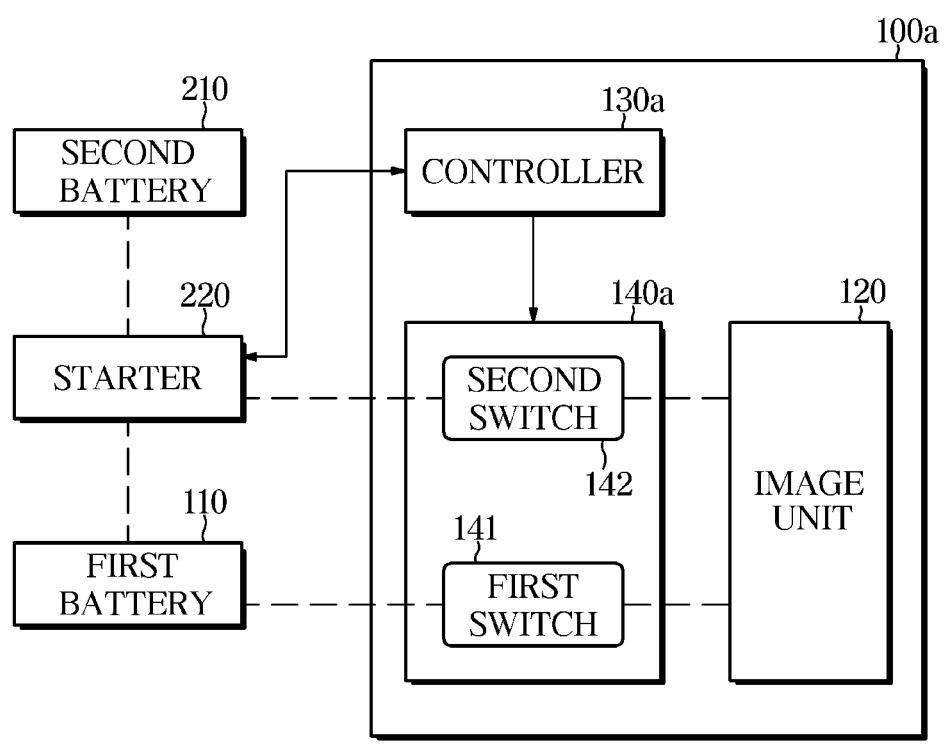
FIG. 1 is a control block diagram illustrating a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. Although the terms "first," "second," "A," "B," etc. may be used to describe various components, the terms do not limit the corresponding components, but are used only for the purpose of distinguishing one component from another component. Reference numerals used for method steps are just used for convenience of explanation, but not to limit an order of the steps. Thus, unless the context clearly dictates otherwise, the written order may be practiced otherwise.

Hereinafter, the principles and exemplary embodiments of the disclosure will be described with reference to the accompanying drawings. Hereinafter, the present disclosure will be described with reference to the accompanying drawings in detail.

Figure 2:
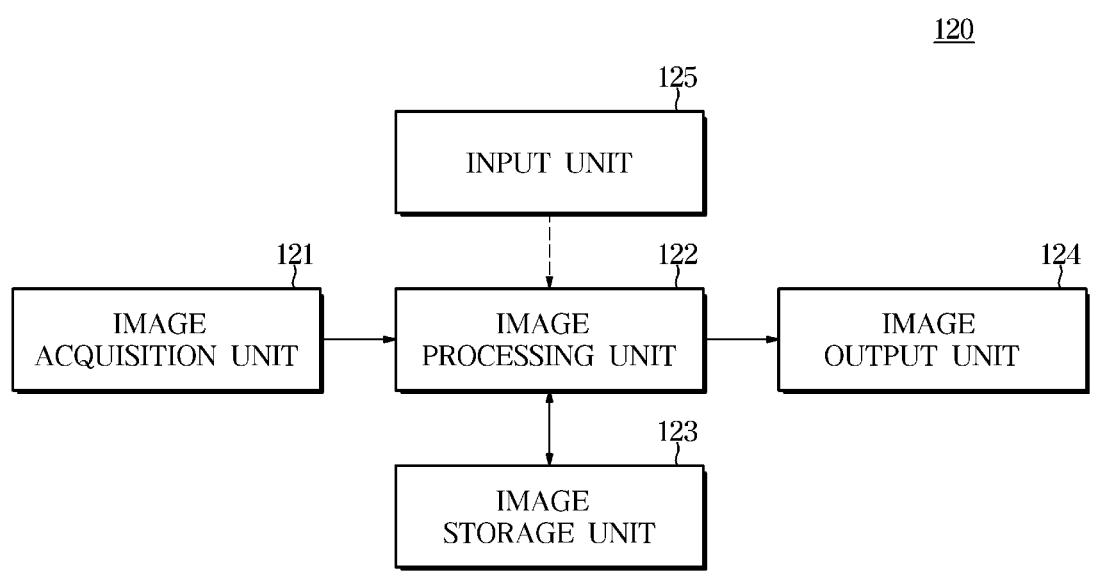
FIG. 2 is a detailed control block diagram illustrating an image processing unit shown in FIG. 1 according to an exemplary embodiment of the present disclosure.

FIG. 1 is a control block diagram illustrating a vehicle according to an exemplary embodiment, and FIG. 2 is a detailed control block diagram illustrating an image processing unit shown in FIG. 1. In the following description, an internal combustion engine vehicle (a general engine vehicle) will be described as an example of the vehicle 1 according to an exemplary embodiment.

The vehicle 1 includes a body that forms an interior and an exterior of the vehicle 1 and a chassis, which is a part of the vehicle 1 except for the body, on which mechanical devices required for traveling are installed. The interior of the vehicle may include an input unit configured to receive operation commands and operation information of at least one electronic device, and a display unit and a speaker configured to output information corresponding to operation information of various functions performable by the vehicle and information corresponding to a user's input.

The input unit may be provided in at least one of a head unit and a center fascia of the vehicle 1, and may be provided in at least one type of a jog dial, a button, a key, a switch, and a touch pad. In addition, the interior of the vehicle may include various electronic devices, such as an audio device, an air conditioner, an audio video navigation (AVN), which is a vehicle terminal that performs an audio function, a video function, and a navigation function.

The vehicle terminal may be provided on a dashboard to be mounted or embedded therein. In particular, the vehicle terminal may be provided as a touch screen in which a touch panel and a display panel are integrated. In addition, the vehicle terminal may include only a display panel. The vehicle terminal may be configured to receive an operation command and operation information through the input unit provided in the center fascia or the head unit.

In addition, the vehicle may further include an electronic device, such as a video recording device 100a. The video recording device 100a may include at least one of a front camera for recording a front video that corresponds to a front image, a black box for recording a front video that corresponds to a front image and traveling information, and a rear camera for recording a rear video that corresponds to a rear image for autonomous driving. The video recording device 100a may be configured to continuously photograph the surroundings of the vehicle 1 and store the photographed images even when the vehicle 1 parked after start-off.

The video recording device 100a may be configured to receive electric power for operating the video recording device 100a from one of a first battery 110 and a starter 220. In other words, the video recording device 100a may be configured to receive electric power for operating the video recording device 100a from the starter 220 when the vehicle 1 is being driven, and receive electric power for operating the video recording device 100a from the first battery 110 when the vehicle 1 stopped and parked. Details of the video recording device 100a will be described later.

The first battery 110 may be a lithium-based battery. In other words, the first battery 110 may be a battery containing lithium or a lithium mixture. Particularly, the lithium mixture may be a material in which lithium and iron phosphate are mixed. The first battery 110 may be a battery having a capacity of about 12.5 Ah. In addition, the first battery 110 may be a battery capable of using about 10 Ah, which is about 80% of the total capacity. The first battery 110 may be a battery that may be rechargeable. Compared with a second battery having the same output capacity, the first battery 110 has a lighter weight, a longer life, and a lower discharge rate. The first battery 110 may be discharged by supplying electric power to the video recording device 100a when the vehicle 1 parked and stopped, and may be charged by the starter 220 when the vehicle 1 being driven.

The vehicle 1 may further include a communication unit configured to communicate with an external device, such as a server or a user terminal, and communicate with a global positioning system (GPS) satellite. The communication unit of the vehicle may include one or more components that enable communication between an external device and various electronic devices provided in the vehicle, and may include, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module. The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The chassis may be a frame that supports the body and may further include a power generation device, a power transmission device, a braking device, and a steering device configured to apply driving force, braking force, and steering force to the front, rear, left, and right wheels, and further include a suspension device. The power generation device may include an engine, a fuel device, a cooling and refueling device, and the like, and generate mechanical power by burning petroleum fuel, such as gasoline and diesel, and transmit the generated mechanical power to the power transmission device, and the like. Particularly, the power transmission device may include at least one of a transmission, a clutch, a final gear, and a differential gear device. In addition, the power generation device, the braking device, the steering device, the suspension device, the power transmission device, and the like may be configured to receive required driving power from the second battery 210.

The vehicle 1 according to the exemplary embodiment may include the second battery 210 configured to supply electric power to the starter 220 for starting the engine. In other words, the vehicle 1 may be configured to operate the starter 220 using the electric power of the second battery 210, and when the starting is completed, generate mechanical power by burning petroleum fuel, such as gasoline and diesel oil, and operate using the mechanical power.

The second battery 210 may be a lead acid battery including lead. The second battery 210 may be a rechargeable battery. The second battery 210 may be a battery having a capacity of about 50 Ah. The electric power charged in the second battery 210 may be used as power for starting the engine, power for switching to a sleep mode of a plurality of electronic devices after starting off, power due to dark current, and the like.

Figure 3:
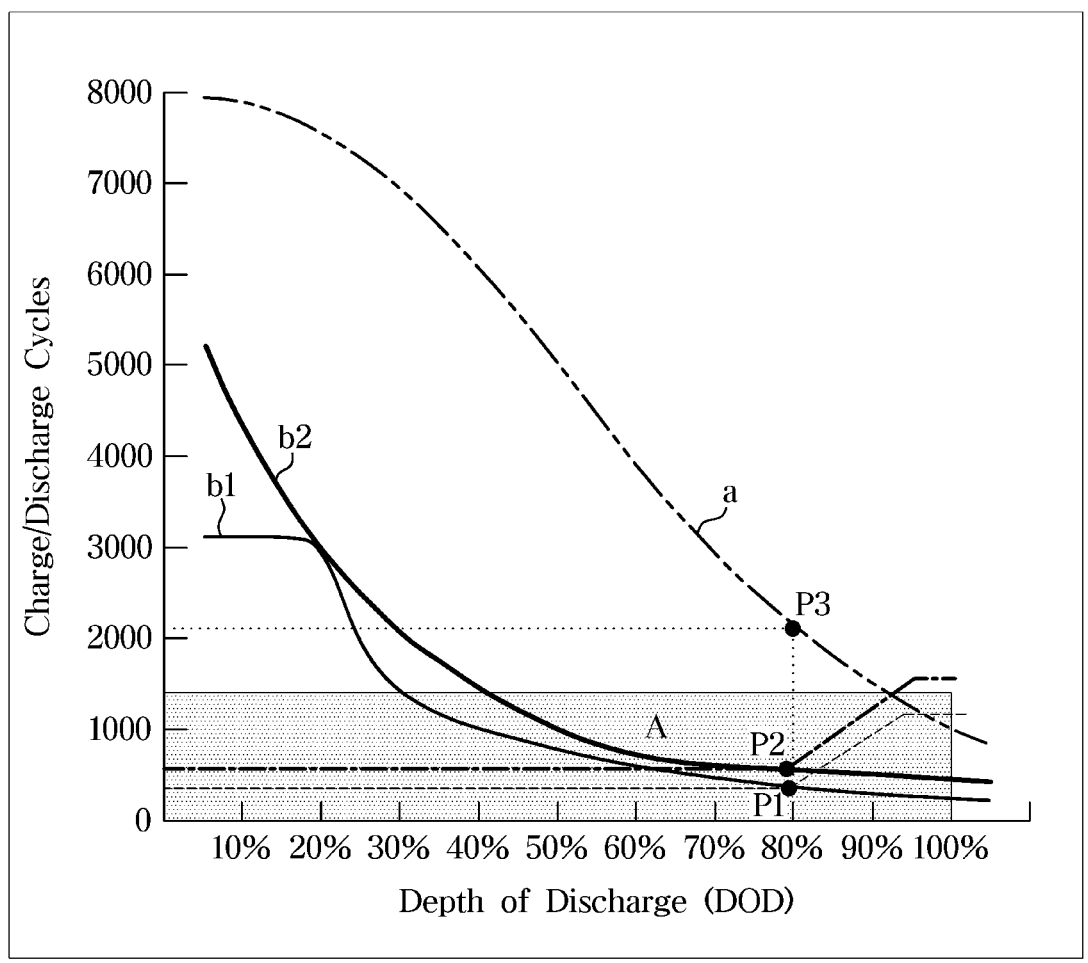
FIG. 3 is a graph showing the number of charge and discharge cycles corresponding to the amount of use of the first and second batteries provided in a vehicle according to an exemplary embodiment of the present disclosure.

FIG. 3 is a graph showing the number of charge and discharge cycles corresponding to the amount of use of the first and second batteries provided in a vehicle according to an exemplary embodiment. In FIG. 3, "a" is a graph showing the number of charge/discharge cycles corresponding to the amount of use of a lithium-based battery, and "b1" and "b2" are graphs showing the number of charge/discharge cycles corresponding to the amount of use of a lead-acid battery. The number of charge/discharge cycles may be information related to the durability of the battery.

Referring to FIG. 3, when charging is performed after discharging 80% of the total charging amount of the battery, the lead-acid-based battery may be available for charging/discharging about 250 times, but the lithium-based battery may be available for charging/discharging about 2200 times. In other words, by implementing the first battery requiring a greater number of charge/discharge cycles using the lithium-based battery, images may be stably obtained and stored, and by implementing the second battery requiring a fewer number of charge/discharge cycles using the lead-based battery, the deterioration of the second battery, which is a battery for starting, may slow down and thus, the staring-purpose battery may be implemented at a lower cost.

The starter 220 may be configured to operate the engine of the power generation device in response to receiving a start-on signal. The starter 220 may include a motor for starting the engine (e.g., a starting motor). The starting motor may be supplied with electric power from the second battery 210, may be operated using the supplied electric power, and transmit a rotational force generated by the driving to the engine to start the engine. In particular, the starting motor may operate as an electric motor. The starting motor may also operate as a generator from the initiation of the travel. Particularly, the starting motor may be operated by the rotational force of the engine, produce electric power using the rotational force by the driving, and charge the first battery 110 and the second battery 210 using the generated electric power.

In addition, the starting motor may operate as a generator while the vehicle is being driven to supply the generated electric power to various electronic devices provided in the vehicle. The starting motor may be an alternator. In addition, the starting motor may be provided separately from the alternator. The starter 220 may further include a start button for receiving a start on/off command. In addition, the vehicle may control the starting in response to receiving an on-signal according to the input of an on-command of the start button.

The video recording device 100a may be configured to perform image acquisition, video file acquisition and storage using the electric power supplied by the starter 220 while the vehicle 1 is being driven, and may be configured to perform image acquisition, video file acquisition and storage using the electric power supplied by the first battery 110 when the vehicle 1 stopped and parked. In addition, the video recording device 100a may be configured to perform image acquisition, video file acquisition and storage using the electric power supplied by the first battery 110 when the amount of electric power transmitted from the starter 220 is less than or equal to a reference power amount when the vehicle 1 is being driven. The video recording device 100a may include an image unit 120, a controller 130a, and a switch unit 140a.

Referring to FIG. 2, the image unit 120 may include an image acquisition unit 121, an image processing unit 122, an image storage unit 123, and an image output unit 124. In addition, the video recording device 100a may further include an input unit 125. The image acquisition unit 121 may be a camera, and may include a charge-coupled device (CCD) or a complementary metal-oxide semiconductor (CMOS) image sensor.

The image acquisition unit 121 may be provided on a window glass inside the vehicle, may be provided on a room mirror inside the vehicle, or may be provided on a roof panel to be exposed to the outside. The image processing unit 122 may be configured to perform at least one of image compression, image restoration, image enhancement, image enlargement, image reduction, image rotation, image segmentation, object recognition, image registration, image correction, preprocessing, weight reduction, and filtering on an image acquired by the image acquisition unit 121. The image processing unit 122 may be configured to obtain the video files by processing the image acquired by the image acquisition unit 121

The image storage unit 123 may be configured to store information regarding the image subjected to the image-processing. The information regarding the image may include the video files. The image storage unit 123 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the image storage unit 123 is not limited thereto.

The image storage unit 123 may be a memory implemented as a chip separated from the processor, which has been above in connection with the image processing unit 122, or may be implemented as a single chip integrated with the processor. The image output unit 124 may be configured to output image information processed by the image processing unit 122 or image information stored in the image storage unit 123. The image output unit 124 may include a display unit. The image information may include the video files. The image output unit 124 may include a video output unit.

The display unit may include a cathode ray tube (CRT) panel, a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto. In addition, the image output unit 124 may be a display unit of the vehicle terminal. The input unit 125 may be configured to receive a user input. The input unit 125 may be an input unit provided in the head unit or the center fascia or an input unit provided in the vehicle terminal.

In particular, the input unit 125 may be configured to receive a time for recording an image from the user when the vehicle is parked and stopped. In other words, the time for recording an image when the vehicle is parked and stopped may be a time set by the user. In addition, the time for recording the image when the vehicle is parked and stopped may be a presetting time. The input unit 125 may be configured to receive a mode-on command and a mode-off command for a parking-video recording mode for recording a video when the vehicle is parked and stopped, and transmit the received mode-on command and mode-off command to the controller 130a. In particular, the parking and the stopped state is a state in which the ignition of the vehicle 1 is turned off.

The controller 130a, in response to receiving a start-off signal from the starter 220, may be configured to execute a parking-video recording mode. Particularly, the controller 130a may be configured to receive the start-off signal from the starter 220 via controller area network (CAN) communication. The controller 130a, while executing the parking-video recording mode, may be configured to operate a first switch 141 of the switch unit 140a to be turned on to transmit the electric power of the first battery 110 to each component of the video recording device 100a. The controller 130a may be configured to detect the time for which the parking-video recording mode is performed or executed and terminate the parking-video recording mode when the detected time passes a setting time.

The detecting or checking of the time for which the parking-video recording mode has been executed may include detected the time counted from the time at which the start-off signal is received. The terminating of the parking-video recording mode may include shutting off power supply from the first battery 110 to the video recording device 100a. In other words, the terminating of the parking-video recording mode may include operating the first switch 141 of the switch unit 140a to be turned off.

In the parking-video recording mode, the controller 130a may be configured to monitor a charging state of the first battery 110, compare a charging amount that corresponds to the monitoring result with a reference charging amount, and when the charging amount of the first battery 110 is less than or equal to the reference charging amount, terminate the parking-video recording mode. In other words, the controller 130a may be configured to operate the first switch 141 of the switch unit 140a to be turned off to terminate the parking video recording mode.

The vehicle 1 may include at least one of a voltage detector or sensor configured to detect the voltage of the first battery 110 and a current detector or sensor configured to detect the current of the first battery 110. The vehicle 1 may further include a temperature detector or sensor configured to detect the temperature of the first battery 110. In other words, the controller 130a may be configured to acquire the charging amount of the first battery 110 based on at least one of the detected voltage and current of the first battery 110. In addition, the controller 130a may be configured to acquire the charging amount of the first battery 110 based on the detected voltage, current, and temperature of the first battery 110.

The controller 130a, in response to receiving the start-on signal from the starter 220, may be configured to operate a second switch 142 of the switch unit 140a to transmit electric power generated by the starter 220 to each component of the video recording device 100a. In particular, the first switch 141 of the switch unit 140a may be in an off state. When the electric power generated by the starter 220 is transmitted to the video recording device 100a, the controller 130a may be configured to convert the electric power generated by the starter 220 to have a voltage and current required to drive the video recording device 100a, and allow the electric power of the converted voltage and current to be transmitted to each component of the video recording device 100a through the second switch 142.

The controller 130a, while in a start-on state, may allow the electric power of the second battery 210 to be supplied to the video recording device 100a when the amount of electric power generated by the generator is less than or equal to a reference amount of electric power. In particular, the vehicle may further include a separate switch. The controller 130a, in response to receiving a start-on signal, may be configured to terminate the parking-video recording mode and execute a traveling-video recording mode. The controller 130a, in response to a start-on signal from the starter 220, may be configured to execute the charging of the first battery 110 and also execute the charging of the second battery 210. In other words, the controller 130a may allow the electric power generated by the starter 220 to be transmitted to the first battery 110 and the second battery 210.

In addition, in the transmitting of the electric power generated in the starter 220 to the first battery 110 and the second battery 210, the controller 130*a* may be configured to convert the electric power generated in the starter 220 to have a voltage and current required for charging the first and second batteries 110 and 210 and allow the electric power of the converted voltage and current to be transmitted to the first battery 110 and the second battery 210.

The controller 130*a* may be connected to the starter 220 via CAN communication, or may be directly connected to the starter 220. The controller 130*a*, upon receiving a signal corresponding to a mode-off command through the input unit 125, may be configured to determine whether a start-off signal is received, and in response determining that a start-off signal is received, maintain the first switch 141 in an off-state. The controller 130*a*, upon receiving a signal corresponding to a mode-on command through the input unit 125 during parking, may be configured to determine whether a start-off signal is received, and in response determining that a start-off signal is received, turn on the first switch 141.

The controller 130*a*, in response to receiving a signal that corresponds to a mode-off command through the input unit 125 during the performing of the parking-video recording mode, may be configured to operate the first switch 141 to be turned off. The controller 130*a* may include a memory (not shown) configured to store data regarding an algorithm for executing the operations of the components of the vehicle 11 or a program that represents the algorithm, and a processor (not shown) that performs the above described operations using the data stored in the memory. At this time, the memory and the processor may be implemented as separate chips. Alternatively, the memory and the processor may be implemented as a single chip.

The switch unit 140*a* may include the first switch 141 connected to the first battery 110 and the second switch 142 connected to the starter 220. Particularly, the first switch 141 may be turned on or off in response to a control command from the controller 130*a*. The first switch 141 may be configured to transmit the electric power of the first battery 110 to the video recording device 100*a* during the on-operation of the first switch 141, and shut off the electric power transmitted from the first battery 110 to the video recording device 100*a* during the off-operation.

The second switch 142 may be turned on or off in response to a control command of the controller 130*a*. The second switch 142 may be configured to transmit the electric power generated by the starter 220 to the video recording device 100*a* during the on operation, and shut off the electric power generated by the starter 220 transmitted to the video recording device 100*a* during the off operation. In addition, the switch unit 140*a* may include a first connector for connecting to the first battery 110 and a second connector for connecting to the starter 220.

In addition, the controller 130*a* and the switch unit 140*a* may be provided separately from the video recording device 100*a*. In other words, the controller 130*a* and the switch unit 140*a* may be separated from the image unit 120 of the video recording device 100*a*. It would be understood by those skilled in the art that at least one component may be added or omitted to correspond to the performances of the components of the vehicle 1 shown in FIGS. 1 and 2. In addition, the mutual positions of the components may be changed to correspond to the performance or structure of the system.

Figure 4:
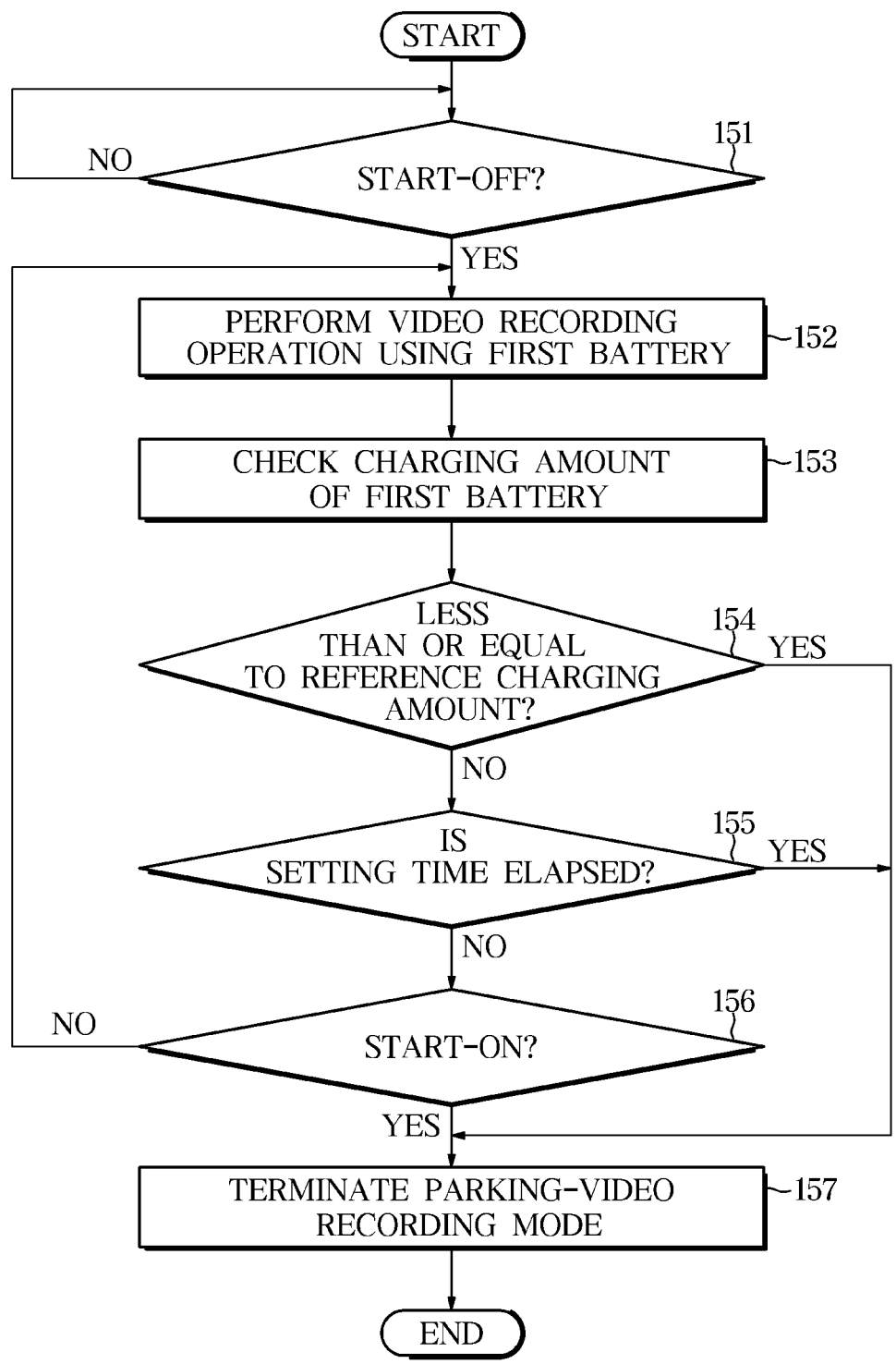
FIG. 4 is a control flowchart showing a vehicle according to an exemplary embodiment of the present disclosure.

The components shown in FIGS. 1 and 2 may refer to a software component and/or a hardware component, such as a Field Programmable Gate Array (FPGA) and an Application Specific Integrated Circuit (ASIC). FIG. 4 is a control flowchart showing a vehicle according to an exemplary embodiment.

The vehicle 1, in response to receiving a start-off signal (151), may be configured to execute the parking-video recording mode. Particularly, the start-off signal may be an operation-off signal of the engine. The performing or execution of the parking video recording mode may include turning on the first switch 141 of the switch unit 140*a* to transmit electric power of the first battery 110 to each component of the video recording device 100*a*. In particular, the video recording device 100*a* may be operated by the electric power of the first battery 110 to perform the video recording operation (152).

The vehicle 1 may be configured to detect the charging amount of the first battery 110 while performing the parking-video recording mode (153). To detect the charging amount of the first battery 110, the vehicle 1 may be configured to detect at least one of the voltage and current of the first battery 110, detect the charging amount of the first battery 110 based on the detected at least one of the voltage and current, compare the detected charging amount of the first battery 110 with a reference charging amount. In addition, the vehicle 1 may further be configured to detect the temperature of the first battery 110, compensate for the charging amount of the first battery 110 identified based on the detected temperature, and compare the compensated charging amount of the first battery 110 with a reference charging amount.

Further, the vehicle 1 may be configured to whether the charging amount of the first battery 110 is less than or equal to the reference charging amount (154), and in response to determining that the charging amount of the first battery 110 is less than or equal to the reference charging amount, terminate the parking video recording mode (157). The vehicle 1, in response to not determining that the charging amount of the first battery 110 is less than or equal to the reference charging amount, that is, in response to determining that the charging amount of the first battery 110 is greater than the reference charging amount, may be configured to detect the time counted from the time at which the start-off signal is received, and compare the counted time with a setting time (155). Particularly, the setting time may be a time set by a user or a time set in advance when the vehicle is manufactured.

The vehicle 1, in response to determining that the counted time has passed the setting time, may be configured to terminate the traveling-video recording mode (157). The terminating of the parking-video recording mode may include shutting off power supply from the first battery 110 to the video recording device 100*a*. In other words, the terminating of the parking video recording mode may include operating the first switch 141 of the switch unit 140*a* to be turned off. The vehicle 1, in response to determining that the counted time has not passed the setting time, may be configured to determine whether a start-on signal is received (156). The start-on signal may be an operation-on signal of the engine. The start-on signal may be an on-signal of the start button, or an ignition-on signal.

Additionally, the vehicle 1, in response to determining that the start-on signal is not received, may be configured to continuously execute the traveling-video recording mode, and in response to determining that the start-on signal is received, may be configured to terminate the traveling-video recording mode (157). The vehicle 1, in response to receiving a start-on command from the user, may be configured to supply electric power of the second battery 210 to the starter 220 to operate the power generation device, such as an engine. At this time, a start-on signal may be generated by the operation of the engine. The vehicle 1, at a time of the traveling-video recording mode terminated in response to receiving the start-on signal, may be configured to turn on the second switch 142 of the switch unit 140a and transmit the electric power generated by the starter 220 to each component of the video recording device 100a through the second switch 142. At this time, the first switch 141 of the switch unit 140a may be in an off state.

When the electric power generated by the starter 220 is transmitted to each component of the video recording device 100a through the second switch 142, the vehicle 1 may be configured to convert the electric power generated by the starter 220 to have a voltage and current required to drive the video recording device 100a, and transmit the converted electric power of the voltage and current to each component of the video recording device 100a through the second switch 142. In addition, the vehicle 1, in response to receiving the start-on signal from the starter 220, may be configured to execute the charging of the first battery 110 and execute the charging of the second battery 210.

When the electric power generated by the starter 220 is transmitted to the first battery 110 and the second battery 210, the vehicle 1 may be configured to convert the electric power generated by the starter 220 to have voltages and currents required to charge the first battery 110 and the second battery 210, and transmit the converted electric power of the voltages and currents to the first battery 110 and the second battery 210. When the charging of the first battery 110 is performed, the charging amount of the first battery 110 may be detected, and the charging of the first battery 110 may be terminated when the detected charging amount is a predetermined full-charging amount. In addition, when the charging of the second battery 210 is performed, the charging amount of the second battery 210 may be detected, and the charging of the second battery 210 may be terminated when the detected charging amount is a predetermined full-charging amount.

Figure 5:
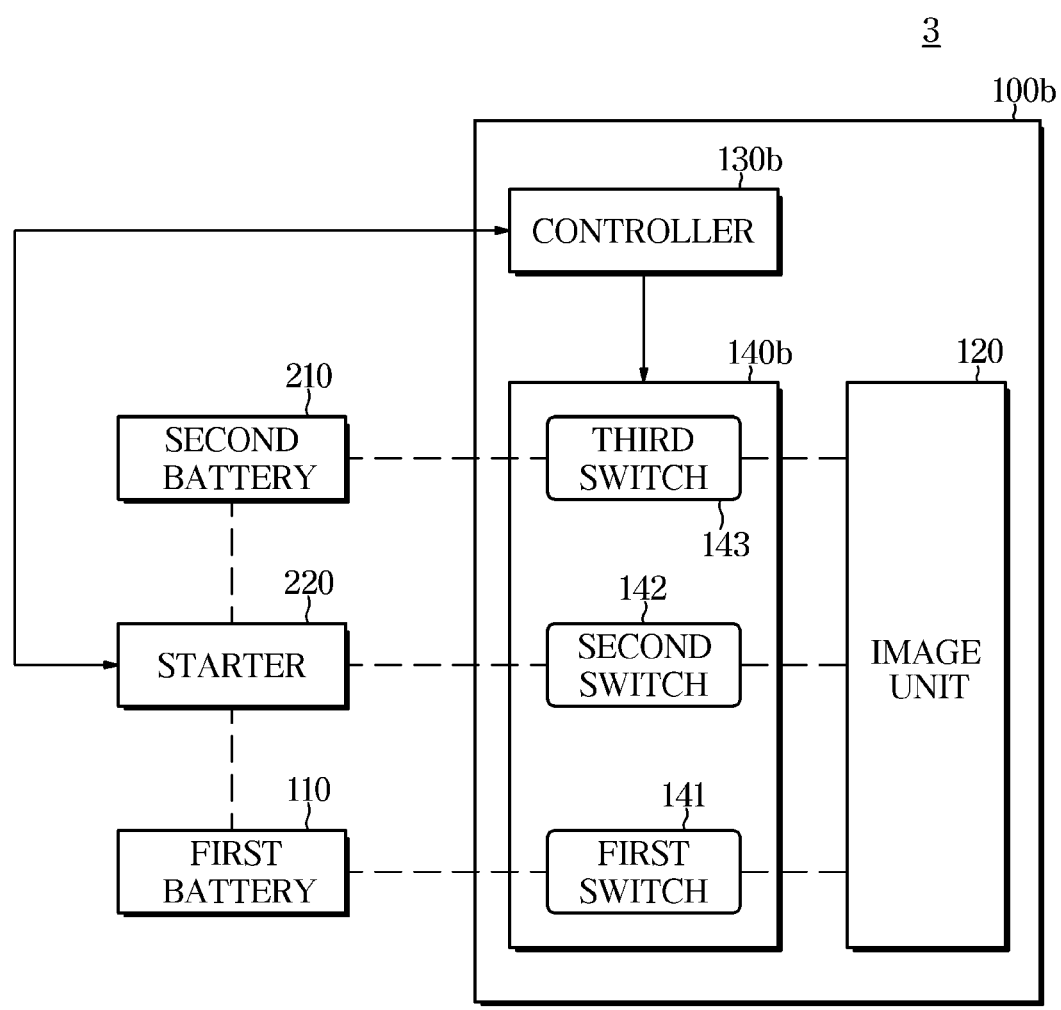
FIG. 5 is a control block diagram illustrating a vehicle according to another exemplary embodiment of the present disclosure.

FIG. 5 is a control block diagram illustrating a vehicle 3 according to another exemplary embodiment, which shows a control configuration of supplying electric power to a video recording device mounted within the vehicle. In the following description, an internal combustion engine vehicle (e.g., a general engine vehicle) will be described as an example of the vehicle 3 according to the exemplary embodiment. In the following description, details of parts identical to those of the previous exemplary embodiment will be omitted.

The vehicle 3 according to the exemplary embodiment may include a video recording device 100b, a first battery 110, a second battery 210, and a starter 220. The video recording device 100b may include at least one of a front camera configured to record a front image, a black box configured to record a front image and traveling information, and a rear camera configured to record a rear image for autonomous driving. The video recording device 100b may be configured to continuously photograph the surroundings of the vehicle 3 and store the photographed images even when the vehicle 3 is parked after start-off. The video recording device 100b may be configured to receive electric power for operating the video recording device 100b from one of the first battery 110, the second battery 210, and the starter 220.

In other words, the video recording device 100b may be configured to receive electric power for operating the video recording device 100b from the starter 220 when the vehicle 3 is being driven, and receive electric power for operating the video recording device 100b from one of the first battery 110 and the second battery 210 when the vehicle 3 is stopped and parked. Details of the video recording device 100b will be described later.

The first battery 110 may be a lithium-based battery. In other words, the first battery 110 may be a battery containing lithium or a lithium mixture. Particularly, the lithium mixture may be a material in which lithium and iron phosphate are mixed. The first battery 110 may be a battery having a capacity of about 7.5 Ah. The first battery 110 may be a rechargeable battery.

Compared with the second battery having the same output capacity, the first battery 110 has a lighter weight, a longer life, and a lower discharge rate. The first battery 110 may be discharged by supplying electric power to the video recording device 100b when the vehicle 1 is parked and stopped, and may be charged by the starter 220 when the vehicle 1 is being driven. The second battery 210 may be a lead acid battery including lead. The second battery 210 may be a rechargeable battery. The second battery 210 may be a battery having a capacity of about 50 Ah.

The electric power charged in the second battery 210 may be used as power for starting the engine, power for operating the video recording device 100b, power for switching to a sleep mode of a plurality of electronic devices after starting off, power due to dark current, and the like. The starter 220 may be configured to operate the engine of the power generation device in response to receiving a start-on signal. The starter 220 may include a motor configured to start the engine (e.g., a starting motor). The starting motor may be supplied with electric power from the second battery 210, may be operated using the supplied power, and transmit a rotational force generated by the driving to the engine to start the engine. In particular, the starting motor may operate as an electric motor.

The starting motor may also operate as a generator when the operation of the vehicle 3 is initiated. Particularly, the starting motor may be operated by the rotational force of the engine, produce electric power using the rotational force by the driving, and allow the first battery 110 and the second battery 210 to be charged using the generated electric power. In addition, the starting motor may operate as a generator during operation of the vehicle 3 to supply the generated electric power to various electronic devices mounted within the vehicle. The starting motor may be an alternator. The starter 220 may further include a start button for receiving a start on/off command. In addition, the vehicle 3 may be configured to adjust the starting in response to receiving an on-signal according to the input of an on-command of the start button.

The video recording device 100b may be configured to perform image acquisition and storage using the electric power supplied by the starter 220 when the vehicle 3 is being driven, and may be configured to perform image acquisition and storage using the electric power supplied by one of the first battery 110 and the second battery 210 when the vehicle 3 is stopped and parked. In addition, the video recording device 100b may be configured to perform image acquisition and storage using the electric power supplied by the first battery 110 when the amount of electric power transmitted from the starter 220 is less than or equal to a reference amount of power when the vehicle is being driven.

The video recording device 100b may include an image unit 120, a controller 130b, and a switch unit 140b. The image unit 210 is the same as the image unit of the above exemplary embodiment, and thus, description thereof will be omitted. The control configuration of the controller 130*b* during travel is also the same as that in the exemplary embodiment, and thus, description thereof is omitted. The controller 130*b*, in response to receiving a start-off signal from the starter 220, may be configured to execute a parking-video recording mode.

The controller 130*b*, during the performing of the parking-video recording mode, may be configured to operate a first switch 141 of the switch unit 140*b* to be turned on to transmit the electric power of the first battery 110 to each component of the video recording device 100*b*. The controller 130*b* may be configured to detect the time for which the parking-video recording mode has been performed and may be configured to operate the first switch 141 of the switch unit 140*b* to be turned off and terminate the parking-video recording mode when the detected time passes a first setting time. The detecting of the time for which the parking-video recording mode has been performed may include detecting the time counted from the time at which the start-off signal is received. The terminating of the parking-video recording mode may include shutting off power supply from the first battery 110 to the video recording device 100*b*.

In the parking-video recording mode, the controller 130*b* may be configured to monitor a charging state of the first battery 110, compare a charging amount corresponding to the monitoring result with a first reference charging amount, and when the charging amount of the first battery 110 is less than or equal to the first reference charging amount, operate the first switch 141 of the switch unit 140*b* to be turned off and operate a third switch 143 of the switch unit 140*b* to be turned on to transmit the electric power of the second battery 210 to the video recording device 100*b*. In other words, the controller 130*b* may be configured to continuously execute the parking-video recording mode.

In the parking-video recording mode, the controller 130*b* may be configured to monitor a charging state of the second battery 210, compare a charging amount corresponding to the monitoring result with a second reference charging amount, and when the charging amount of the second battery 210 is less than or equal to the second reference charging amount, operate the third switch 143 of the switch unit 140*b* to be turned off to terminate the parking-video recording mode.

The vehicle 3 may include at least one of a first voltage detector or sensor configured to detect the voltage of the first battery 110 and a first current detector or sensor configured to detect the current of the first battery 110. The vehicle 3 may further include a first temperature detector or sensor configured to detect the temperature of the first battery 110. In other words, the controller 130*b* may be configured to acquire the charging amount of the first battery 110 based on at least one of the detected voltage and current of the first battery 110. In addition, the controller 130*b* may be configured to acquire the charging amount of the first battery 110 based on the detected voltage, current, and temperature of the first battery 110.

In addition, the vehicle 3 may include at least one of a second voltage detector or sensor configured to detect the voltage of the second battery 210 and a second current detector or sensor configured to detect the current of the second battery 210. The vehicle 3 may further include a second temperature detector or sensor configured to detect the temperature of the second battery 210. In other words, the controller 130*b* may be configured to acquire the charging amount of the second battery 210 based on at least one of the detected voltage and current of the second battery 210.

In addition, the controller 130*b* may be configured to acquire the charging amount of the second battery 210 based on the detected voltage, current, and temperature of the second battery 210.

The controller 130*b*, in the transmitting of the electric power of the second battery 210 to the video recording device 100*b*, may be configured to detect the time for which the parking-video recording mode has been performed, and operate the third switch 143 of the switch unit 140*b* to be turned off and terminate the parking-video recording mode when the detected time passes a second setting time. The second setting time may be the same as or different from the first setting time.

Additionally, the controller 130*b* may include a memory (not shown) configured to store data regarding an algorithm for executing the operations of the components of the vehicle 11 or a program that represents the algorithm, and a processor (not shown) that performs the above described operations using the data stored in the memory. At this time, the memory and the processor may be implemented as separate chips. Alternatively, the memory and the processor may be implemented as a single chip.

The switch unit 140*b* may include the first switch 141 connected to the first battery 110, the second switch 142 connected to the starter 220, and the third switch 143 connected to the second battery 210. In particular, the first switch 141 may be turned on or off in response to a control command of the controller 130*b*. The first switch 141 may be configured to transmit the electric power of the first battery 110 to the video recording device 100*b* during the on-operation, and shut off the electric power transmitted from the first battery 110 to the video recording device 100*b* during the off-operation.

The second switch 142 may be turned on or off in response to a control command of the controller 130*b*. The second switch 142 may be configured to transmit the electric power generated by the starter 220 to the video recording device 100*b* during the on operation, and shut off the electric power generated by the starter 220 transmitted to the video recording device 100*b* during the off operation.

The third switch 143 may be turned on or off in response to a control command of the controller 130*b*. The third switch 143 may be configured to transmit the electric power generated by the second battery 210 to the video recording device 100*b* during the on operation, and shut off the electric power supplied from the second battery 210 to the video recording device 100*b* during the off operation. In addition, the switch unit 140*b* may include a first connector for connecting to the first battery 110, a second connector for connecting to the starter 220, and a third connector for connecting to the second battery 210.

Figure 6:
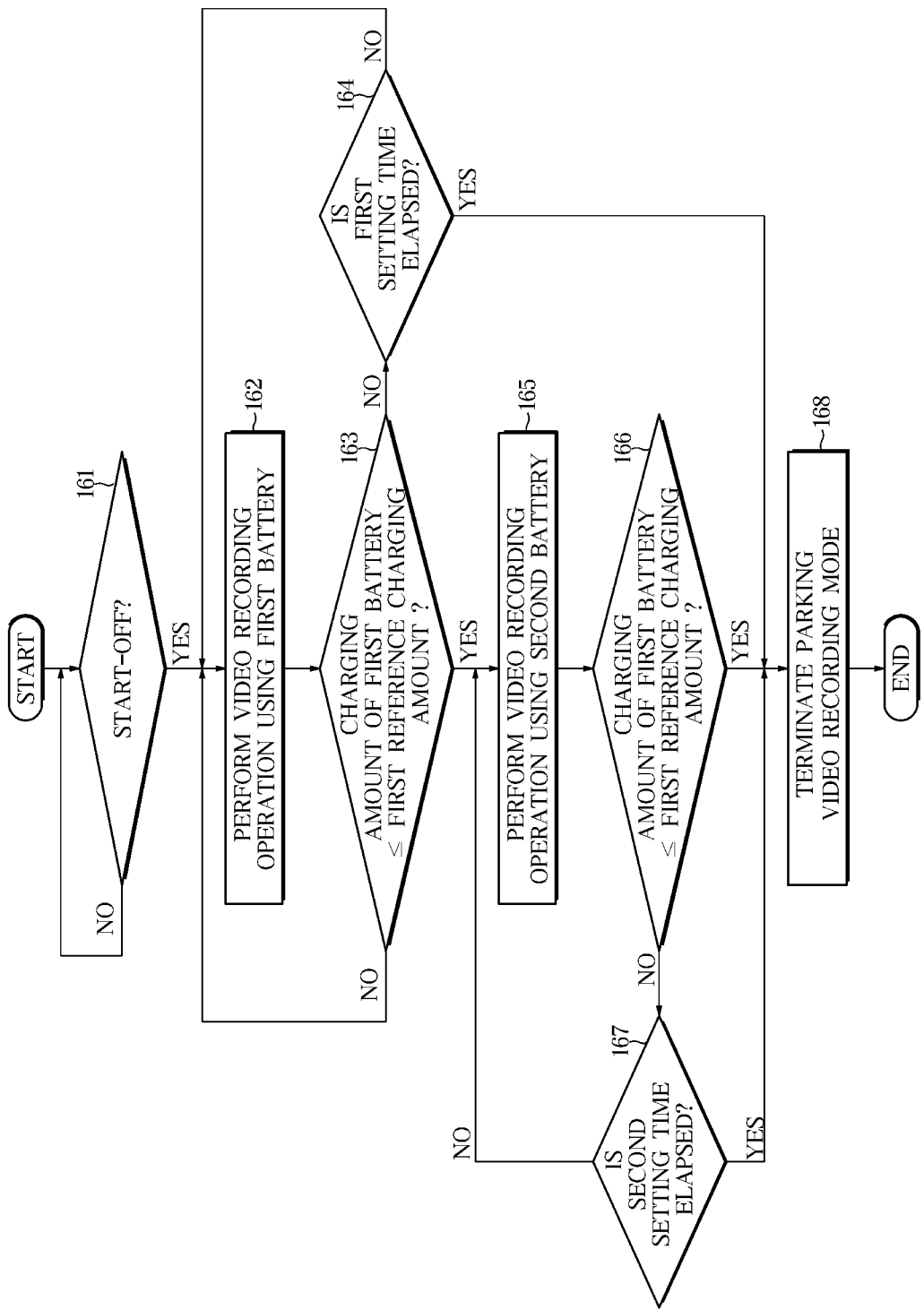
FIG. 6 is a control flowchart showing a vehicle according to another exemplary embodiment of the present disclosure.

FIG. 6 is a control flowchart showing a vehicle according to another exemplary embodiment. The vehicle 3, in response to receiving a start-off signal (161), may be configured to execute the parking-video recording mode. In particular, the start-off signal may be an operation off signal of the engine. The executing of the parking video recording mode may include turning on the first switch 141 of the switch unit 140*b* to transmit electric power of the first battery 110 to each component of the video recording device 100*b*. In particular, the video recording device 100*b* may be operated by the electric power of the first battery 110 to perform the video recording operation (162).

The vehicle 3 may be configured to detect the charging amount of the first battery 110 while performing the parking-video recording mode. Herein, the operation of detecting the charging amount of the first battery 110 is the same as that of the previous exemplary embodiment, and description thereof will be omitted. The vehicle 3 may be configured to determine whether the charging amount of the first battery 110 is less than or equal to the first reference charging amount (163), and in response to not determining that the charging amount of the first battery 110 is less than or equal to the reference charging amount, that is, in response to determining that the charging amount of the first battery 110 is greater than the reference charging amount, detect the time counted from the time at which the start-off signal is received, and compare the counted time with the first setting time (164).

Particularly, the first setting time may be a time set by a user or a time set in advance when the vehicle is manufactured. The vehicle 3, in response to determining that the counted time has passed the first setting time, may be configured to terminate the traveling-video recording mode (168). The terminating of the parking-video recording mode may include shutting off power supply from the first battery 110 to the video recording device 100*b*. In other words, the terminating of the parking video recording mode may include operating the first switch 141 of the switch unit 140*b* to be turned off.

The vehicle 3, in response to determining that the charging amount of the first battery 110 is greater than the first reference charging amount and the counted time has not passed the first setting time, may be configured to continue executing the parking-video recording mode using the electric power of the first battery 110. The vehicle 3, in response to determining that the charging amount of the first battery 110 is less than or equal to the first reference charging amount, may be configured to operate the first switch 141 of the switch unit 140*b* to be turned off and operate the third switch 143 of the switch unit 140*b* to be turned on to transmit electric power of the second battery 210 to the video recording device 100*b*. In other words, the vehicle 3 may be configured to maintain executing the parking video recording operation by supplying the electric power of the second battery 210 to the video recording device 100*b* (165).

The controller 130*b* may be configured to monitor a charging state of the second battery 210 in the parking-video recording mode using the electric power of the second battery 210 and compare a charging amount corresponding to the monitoring result with a second reference charging amount. When the charging amount of the second battery 210 is less than or equal to the second reference charging amount (166), the controller 130*b* may be configured to operate the third switch 143 of the switch unit 140*b* to be turned off to terminate the parking video recording mode (168).

The vehicle 3, in response to not determining that the charging amount of the second battery 210 is less than or equal to the second reference charging amount, that is, in response to determining that the charging amount of the second battery 210 is greater than the second reference charging amount, may be configured to detect the time for which the parking video recording mode has been performed. In response to determining that the detected time passes a second setting time (167), the vehicle 3 may be configured to operate the third switch 143 of the switch unit 140*b* to be turned off and terminate the parking video recording mode (168).

The time for which the parking video recording mode has been performed may be the time counted from the time at which the start-off signal is received. The time for which the parking video recording mode has been performed may be the time for which the video recording mode has been performed using the second battery 210. Particularly, the terminating of the parking-video recording mode may include shutting off power supply from the second battery 210 to the video recording device 100*b*. In other words, the terminating of the parking video recording mode may include operating the third switch 143 of the switch unit 140*b* to be turned off.

The vehicle 3, in response to determining that the charging amount of the second battery 210 is greater than the second reference charging amount and the time for which the parking video recording mode has been performed does not pass the second setting time, may be configured to continue executing the parking-video recording mode using the electric power of the second battery 210. In particular, the third switch 143 of the switch unit 140*b* may be maintained in an on-state. The second setting time may be the same as or different from the first setting time.

The operation of detecting the charging amount of the second battery 210 is the same as the operation of detecting the charging amount of the first battery 110. In other words, the charging amount of the second battery 210 may be detected based on at least one of the voltage and the current of the second battery 210, and may detected further using the temperature of the second battery 210. The vehicle 3, in response to determining that the time for which the parking video recording mode has been performed does not pass the first setting time, may be configured to determine whether a start-on signal is received.

In addition, the vehicle 3, in response to determining that the time for which the parking video recording mode has been performed does not pass the second setting time, may be configured to determine whether a start-on signal is received. The vehicle 3, in response to determining that the charging amount of the second battery 210 is greater than the second reference charging amount, may be configured to determine whether a start-on signal is received. The start-on signal may be an operation-on signal of the engine. In particular, the start-on signal may be an on-signal of the start button, or an ignition-on signal.

The vehicle 3, in response to determining that the start-on signal is not received, may be configured to continue executing the traveling-video recording mode, and in response to determining that the start-on signal is received, terminate the traveling-video recording mode. Additionally, in response to receiving a start-on command from the user, the vehicle 3 may be configured to supply electric power of the second battery 210 to the starter 220 to operate the power generation device, such as an engine. At this time, a start-on signal may be generated by the operation of the engine.

When the traveling-video recording mode is terminated in response to receiving the start-on signal, the vehicle 3 may be configured to on the second switch 142 of the switch unit 140*b* and transmit the electric power generated by the starter 220 to each component of the video recording device 100*b* through the second switch 142. At this time, the first switch 141 and the third switch 143 of the switch unit 140*b* may be in an off state. In addition, in response to receiving a start-on signal from the starter 220, the vehicle 3 may be configured to execute the charging of the first battery 110 and execute the charging of the second battery 210.

Figure 7:
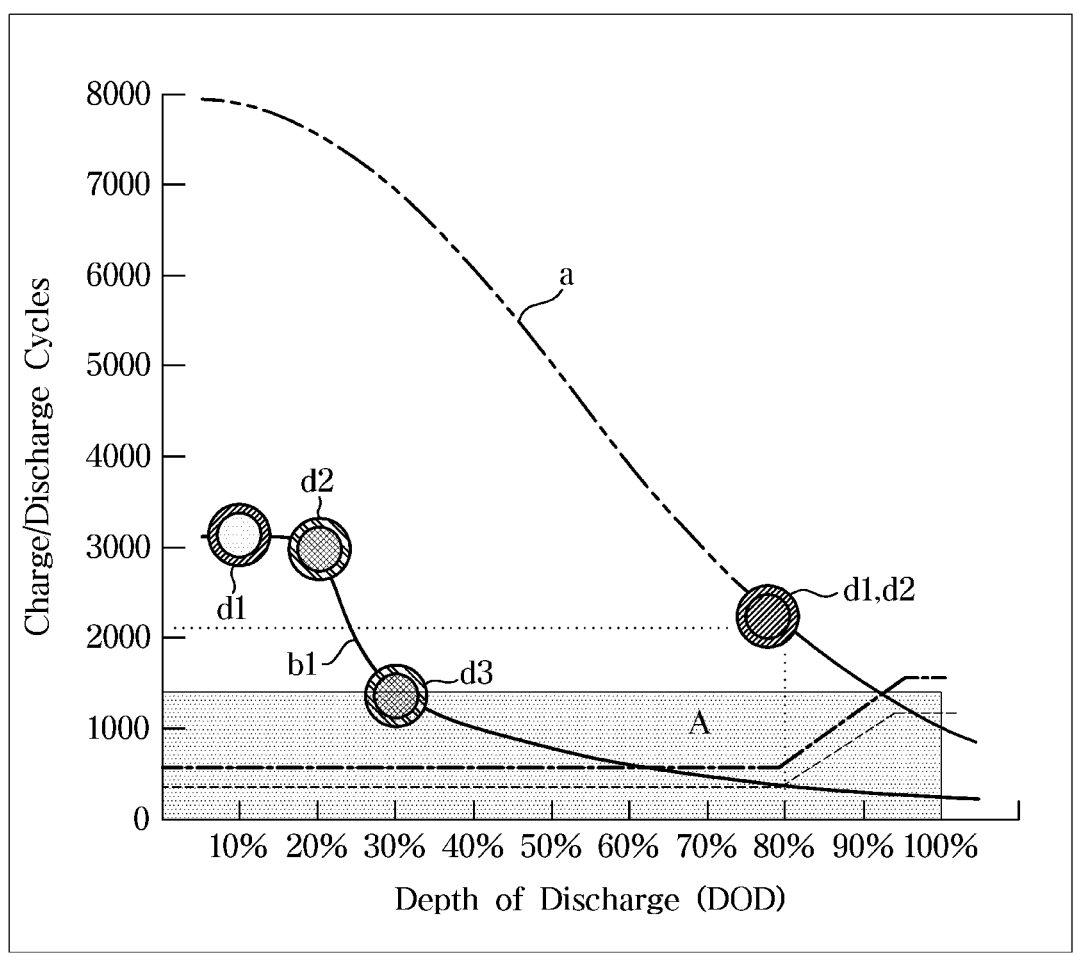
FIG. 7 is a graph showing the durability of first and second batteries provided in a vehicle according to an exemplary embodiment, the durability of first and second batteries provided in a vehicle according to another exemplary embodiment, and the durability of a first battery according to the conventional technology.

FIG. 7 is a graph showing charge/discharge cycles corresponding the use amounts of first and second batteries. In FIG. 7, a graph "a" shows the charge/discharge cycles corresponding to a use amount of a lithium-based battery (that is, a first battery), and a graph "b1" shows the charge/discharge cycles corresponding to a use amount of a lead acid-based battery (that is, a second battery). The graphs "a"

and "b1" show the durability of first and second batteries according to the one exemplary embodiment, the durability of first and second batteries according to the other exemplary embodiments, and the durability of first and second batteries according to the conventional technology.

Under the assumption that the parking video recording mode consumes electric current of 500 mA per hour, and with operation of twelve hours, a total of 6 Ah of electric current is consumed for the video recording. In addition, under the assumption that a second battery has a capacity of 50 Ah and four hour-parking after arrival at the office, four hour-parking after midday traveling, and twelve hour-parking after arrival at home are performed, the battery durability according to the one exemplary embodiment, the other exemplary embodiment, and the conventional technology are described as follows.

According to the one exemplary embodiment in which only the first battery is used for the parking video recording mode and the second battery is not used, as shown point d1, the first battery having a capacity of 12.5 Ah may be charged/discharged about 2000 times or more at a consumption level of 80% of the total charging amount, and the second battery may be charged/discharged about 3000 times or more at a consumption level of 10% (5 Ah) per day. In other words, the durability of both the first and second batteries may be improved.

According to the other exemplary embodiment in which both the first battery and the second battery are used to perform the parking video recording mode, as shown in point d2, the first battery having a capacity of 7.5 Ah may be charged/discharged about 2000 times or more at a consumption level of about 80% of the total charging amount (6 Ah=2 Ah after arrival at the office+2 Ah after midday traveling+2 Ah after arrival at home), and since the second battery is used only when the first battery has a charging amount less than the first reference charging amount, the second battery is used only 18% of the total charging amount (5 Ah+4 Ah) per day, and thus may be charged/discharged about 3000 times or more. In other words, the durability of both the first and second batteries may be improved.

According to the conventional technology in which only a single second battery is used to perform the parking video recording mode, 4% of discharge (2 Ah for four hour-parking) is performed two times, and 12% of discharge (6 Ah for twelve hour-parking) is performed one time. In addition, the current of the second battery may be consumed about 10% (5 Ah) for other functions, except for the video recording, such as entering the starting, entering a sleep mode of a plurality of electronic devices after start-off, dark current and the like.

Accordingly, as shown point d3 in the graph "b1", charging/discharging is performed 1500 times with 30% of daily use (4%*2+12%+10%), resulting in a level below the assurance standard. Area "A" in the graph represents an assurance dissatisfaction area. In other words, according to the conventional technology, assurance for the second battery is not satisfied. According to the other exemplary embodiment, the first battery having a capacity lower than with the one exemplary embodiment is used, and thus, the product price may be decreased to a level of about 40%.

Figure 8:
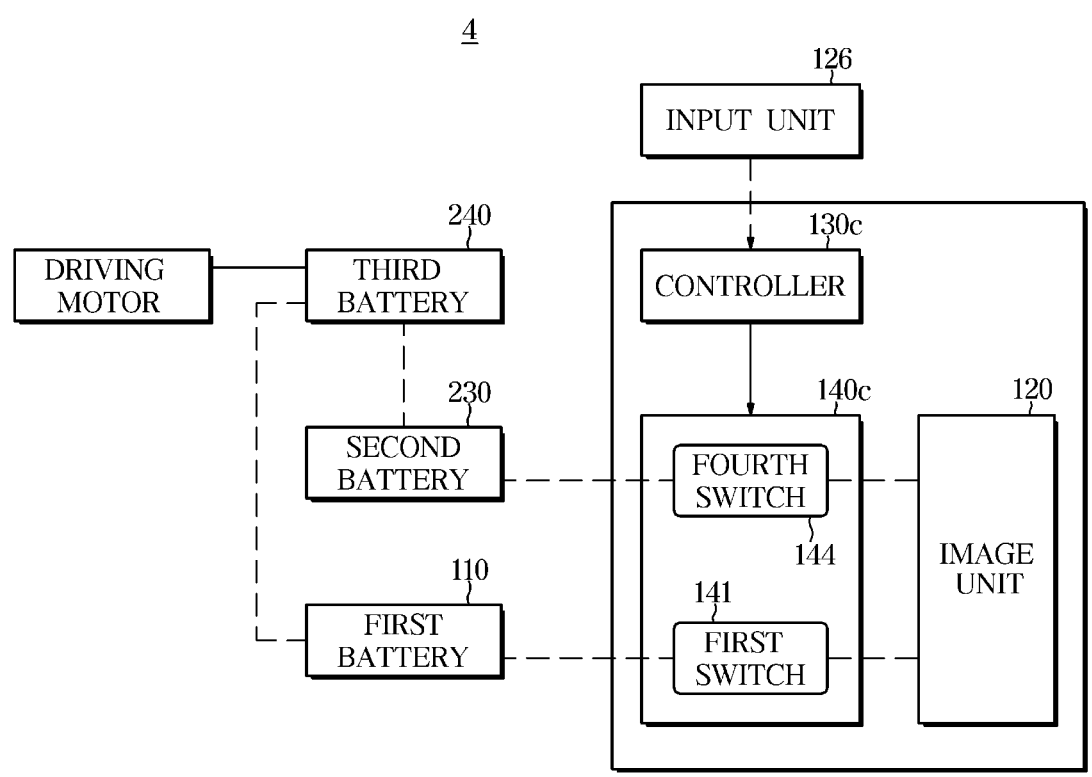
FIG. 8 is a control block diagram illustrating a vehicle according to another exemplary embodiment of the present disclosure.

FIG. 8 is a control block diagram illustrating a vehicle according to another exemplary embodiment. In the following description, a hybrid vehicle will be described as an example of a vehicle 4 according to the exemplary embodiment.

The hybrid vehicle includes an engine, a battery, and a driving motor, and may be operated by adjusting the mechanical power of the engine and the electric power of the driving motor. The hybrid vehicle may further include a generator configured to start the engine. The vehicle 4 according to the exemplary embodiment may include a video recording device 100c, a first battery 110, a second battery 230, and a third battery 240, and further include an input unit 126.

The video recording device 100c may include at least one of a front camera configured to record a front image, a black box configured to record a front image and traveling information, and a rear camera configured to record a rear image for autonomous driving. The video recording device 100c may be configured to continuously photograph the surroundings of the vehicle 4 and store the photographed images even when the vehicle 4 is parked after start-off.

The video recording device 100c may be configured to receive electric power for operating the video recording device 100c from one of a first battery 110 and a second battery 230. In other words, the video recording device 100c may be configured to receive electric power for driving the video recording device 100c from the second battery 230 when the vehicle 4 is being driven, and may be configured to receive electric power for driving the video recording device 100c from the first battery 110 when the vehicle 4 is stopped and parked. Details of the video recording device 100c will be described later.

The first battery 110 may be a lithium-based battery. In other words, the first battery 110 may be a battery containing lithium or a lithium mixture. Particularly, the lithium mixture may be a material in which lithium and iron phosphate are mixed. The first battery 110 may be a battery having a capacity of about 7 Ah or 12.5 Ah. The first battery 110 may be a battery that may be rechargeable. The first battery 110 may be discharged by supplying electric power to the video recording device 100c when the vehicle 4 is parked and stopped, and may be charged by a third battery 240 when the vehicle 4 is being driven.

The second battery 230 may be a lead acid battery including lead. The second battery 230 may be a rechargeable battery. The second battery 230 may be charged by the third battery 240 when the vehicle 4 is being driven. The electric power charged in the second battery 230 may be used as power for driving a plurality of electronic devices, power for starting the engine, power for switching to a sleep mode of a plurality of electronic devices after start-off, power due to dark current, and the like.

In other words, the second battery 230 may be configured to supply current to various electronic devices provided in the vehicle 4 regardless of the start-on/off such that the basic operations of the various electronic devices are performed. Such a current is referred to as dark current. For example, the video recording device 100c among various electronic devices may be supplied with electric power of the second battery 230 to continuously photograph the surroundings even when the vehicle 4 is parked after start-off. In other words, the second battery 230 may be continuously discharged after the start-off of the vehicle 4. When compared with the second battery 230, the first battery 110 is slow in deterioration according to the same number of charge/discharge cycles.

The third battery 240 may be configured to supply driving power to the driving motor and may be charged by the driving motor that operates as a generator during regenerative braking of the driving motor. The electric power applied to the driving motor may be shut off at the time of decelerating and braking, and generates torque in the reverse direction. At this time, the driving motor rotates in the same direction as a direction in which the driving motor rotates before the braking time point by the inertial force. The third battery 240 may be configured to supply electric power for charging the first and second batteries 110 and 230.

The vehicle 4 may further include a converter configured to convert the voltage of the third battery 240 into a voltage for charging the first and second batteries 110 and 230. In particular, the convertor may be configured to convert direct current (DC) power of the third battery 240 into DC power suitable for charging the second battery 230, and supply the converted DC power to the second battery 230 to charge the second battery 230. In addition, the convertor may be configured to convert the DC power of the third battery 240 into DC power suitable for charging the first battery 110 and supply the converted DC power to the first battery 110 to charge the first battery 110.

Additionally, the vehicle 4 may include a start button for receiving a key on/off command Particularly, the key on/off command corresponds to the start on/off command described in the one exemplary embodiment. In addition, the vehicle 4 may control the starting of the engine when an on-signal is received in response to an input of the on-command of the start button provided in the input unit 126.

The video recording device 100c may be configured to perform image acquisition and storage using the electric power supplied by the second battery when the vehicle 4 is being driven, and perform image acquisition and storage using electric power supplied by one of the first battery 110 and the second battery 230 when the vehicle 4 is stopped and parked. In addition, the video recording device 100c may be configured to perform image acquisition and storage using electric power supplied from the second battery 230 when the amount of electric power transmitted from the first battery 110 is less than or equal to a reference power amount when the vehicle 4 is being driven.

The video recording device 100c may include an image unit 120, a controller 130c, and a switch unit 140c. The controller 130c, in response to receiving a key-off signal from the input unit 126, may be configured to execute a parking-video recording mode. In particular, the controller 130c may be configured to receive the start-off signal via CAN communication. The controller 130c, during the execution of the parking-video recording mode, may be configured to operate a first switch 141 of the switch unit 140c to be turned on to transmit the electric power of the first battery 110 to each component of the video recording device 100c.

The controller 130c may be configured to detect the time for which the parking-video recording mode has been performed, and terminate the parking-video recording mode when the detected time passes a first setting time. The detecting of the time for which the parking-video recording mode has been performed may include detecting the time counted from the time at which the key-off signal is received. The terminating of the parking-video recording mode may include shutting off power supply from the first battery 110 to the video recording device 100c. In other words, the terminating of the parking video recording mode may include operating the first switch 141 of the switch unit 140c to be turned off.

In the parking-video recording mode, the controller 130c may be configured to monitor a charging state of the first battery 110, compare a charging amount corresponding to the monitoring result with a first reference charging amount, and when the charging amount of the first battery 110 is less than or equal to the first reference charging amount, terminate the parking-video recording mode. In other words, the controller 130c may be configured to operate the first switch 141 of the switch unit 140c to be turned off to terminate the parking video recording mode.

The controller 130c, in response to receiving a key-on signal, may be configured to operate a fourth switch 144 of the switch unit 140c to be turned on to transmit electric power generated by the second battery 230 to each component of the video recording device 100c. In particular, the first switch 141 of the switch unit 140c may be in an off state. The controller 130c, in response to receiving a key on signal via CAN communication, may be configured to execute the charging of the first battery 110 and transmit electric power of the second battery 230 to the video recording device 100c.

In the parking video recording mode, the controller 130c, when the charging amount of the first battery 110 is less than or equal to the first reference charging amount, may be configured to operate the first switch 141 of the switch unit 140c to be turned off and operate the fourth switch 144 of the switch unit 140c to be turned on to transmit the electric power of the second battery 230 to the video recording device 100c. In other words, the parking-video recording mode of the video recording device 100c may be maintained. In the performing of the parking video recording mode using the electric power of the second battery 230, the controller 130c may be configured to detect the time for which the parking-video recording mode has been performed and terminate the parking-video recording mode when the detected time passes a second setting time.

The controller 130c may be configured to detect the charging amount of the second battery 230 while the vehicle 4 is being driven, and when the charging amount of the second battery 230 is less than or equal to a reference discharging amount, execute the charging of the second battery 230. The controller 130c, when determined that the performance of the third battery 240 for driving is degraded, may be configured to supply the electric power of the first battery 110 to the driving motor. The controller 130c may be configured to supply electric power of the first battery 110 to the video recording device 100c when the vehicle traveling speed is less than or equal to a reference speed.

Additionally, the controller 130c may include a memory (not shown) configured to store data regarding an algorithm for executing the operations of the components of the vehicle 11 or a program that represents the algorithm, and a processor (not shown) that performs the above described operations using the data stored in the memory. At this time, the memory and the processor may be implemented as separate chips. Alternatively, the memory and the processor may be implemented as a single chip.

The switch unit 140c may include the first switch 141 connected to the first battery 110 and the fourth switch 144 connected to the second battery 230. In particular, the first switch 141 may be turned on or off in response to a control command of the controller 130c. The first switch 141 may be configured to transmit the electric power of the first battery 110 to the video recording device 100c during the on-operation, and shut off the electric power transmitted from the first battery 110 to the video recording device 100c during the off-operation.

The fourth switch 144 may be turned on or off in response to a control command of the controller 130c. The fourth switch 144 may be configured to transmit the electric power of the second battery 230 to the video recording device 100c during the on-operation, and shut off the electric power supplied from the second battery 230 to the video recording device 100c during the off-operation. In addition, the switch unit 140c may include a first connector for connecting to the first battery 110, and a third connector for connecting to the second battery 230. The vehicle may be an electric vehicle, and in this case, the second battery 230 may be a lead-acid base battery or a lithium-based battery having a reference capacity or less.

Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium.

The non-transitory computer-readable recording medium includes all types of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the present invention may stably record a surrounding image of the vehicle with minimum battery capacity at a time of parking or stopping, by using a lithium-based battery having superior charging efficiency, compact size and light weight, high durability, and lower risk of explosion and ignition compared to a lead-based battery.

The present invention may maximize the time of recording an image during the parking or stopping of the vehicle. In other words, the present invention may acquire sufficient amount of surrounding images of the vehicle even when the vehicle is parked/stopped for a substantial period of time. The present invention may prolong the lifespan of a battery for starting the vehicle by preventing deterioration of the battery for starting the vehicle, thereby ensuring the quality assurance period of the battery for starting the vehicle, and providing convenience of use of the vehicle The present invention may improve the quality and marketability of the vehicle by optimizing the use logic of the battery for the video recording device and the battery for starting the vehicle, and further may increase the user's satisfaction, and improve the user's convenience, reliability and vehicle safety, and secure the product competitiveness.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle, comprising:
   a video recording device;
   a first battery connected to the video recording device;
   a second battery for starting an engine;
   a generator configured to generate electric power using rotary power of the engine;
   a switch unit having a first switch connected to the first battery and a second switch connected to the generator; and
   a controller configured to:
   in response to receiving a start-off signal, operate the first switch to be turned on to supply electric power of the first battery to the video recording device;
   in response to receiving a start-on signal, operate the second switch to be turned on to supply electric power generated by the generator to the video recording device; and
   execute charging of the first and second batteries using electric power generated by the generator.

2. The vehicle of claim 1, wherein the first battery is a lithium-based battery and the second battery is a lead acid-based battery.

3. The vehicle of claim 1, wherein the controller is configured to count a time from a reception time of the start-off signal, and operate the first switch to be turned off when the counted time passes a setting time.

4. The vehicle of claim 1, wherein the controller, while the first switch is in an on-state, is configured to identify a charging amount of the first battery, and operate the first switch to be turned off when the identified charging amount of the first battery is less than or equal to a reference charging amount.

5. The vehicle of claim 1, wherein in a start-on state, the controller allows electric power of the second battery to be supplied to the video recording device when an amount of electric power generated by the generator is less than or equal to a reference amount of electric power.

6. A vehicle, comprising:
   a video recording device;
   a first battery connected to the video recording device;
   a second battery configured to start an engine;
   a generator configured to generate electric power using rotary power of the engine;
   a switch unit having a first switch connected to the first battery, a second switch connected to the generator, and a third switch connected to the second battery; and
   a controller configured to:
   in response to receiving a start-off signal, execute a parking-video recording mode;
   operate the first switch to be turned on to supply electric power of the first battery to the video recording device during the performance of the parking-video recording mode;
   operate the third switch to be turned on to supply electric power of the second battery to the video recording device when a charging amount of the first battery is less than or equal to a first reference charging amount; and
   in response to receiving a starting-on signal, terminate the parking-video recording mode and perform a traveling-video recording mode and operate the second switch to be turned on to supply electric power generated by the generator to the video recording device during the performance of the traveling-video recording mode.

7. The vehicle of claim 6, wherein the first battery is a lithium-based battery and the second battery is a lead acid-based battery.

8. The vehicle of claim 6, wherein, the controller, while the first switch is in an on-state, is configured to count a time from a reception time of the start-off signal, and operate the first switch to be turned off when the counted time passes a setting time.

9. The vehicle of claim 6, wherein the controller, while the third switch is in an on-state, is configured to count a time from a reception time of the start-off signal, and operate the third switch to be turned off when the counted time passes a predetermined second time.

10. The vehicle of claim 6, wherein the controller, in response to receiving a start-on signal, is configured to operate the second switch to be turned on to supply electric power generated by the generator to the video recording device, and execute charging of the first and second batteries using electric power generated by the generator.

11. The vehicle of claim 6, wherein the controller, while the third switch is in an on-state, is configured to terminate the parking-video recording mode when a charging amount of the second battery is less than or equal to a second reference charging amount.

12. A vehicle, comprising:
a video recording device;
a first battery connected to the video recording device;
a second battery configured to supply electric power to a plurality of electronic devices;
a switch unit having a first switch connected to the first battery and a fourth switch connected to the second battery; and
a controller configured to:
in response to receiving a key-off signal, execute a parking-video recording mode;
operate the first switch to be turned on to supply electric power of the first battery to the video recording device during the performance of the parking-video recording mode; and
operate the fourth switch to be turned on to supply electric power of the second battery to the video recording device when a charging amount of the first battery is less than or equal to a first reference charging amount.

13. The vehicle of claim 12, further comprising
a third battery configured to supply electric power to a driving-purpose motor for rotating vehicle wheels,
wherein the controller, in response to receiving a key-on signal, is configured to terminate the parking-video recording mode and execute a traveling-video recording mode, and adjust electric power of the third battery to be supplied to the first and second batteries to charge the first and second batteries during the performance of the traveling-video recording mode.

14. The vehicle of claim 12, wherein the controller, while the first switch is in an on-state, is configured to count a time from a reception time of the key-off signal, and operate the first switch to be turned off when the counted time passes a first setting time.

15. The vehicle of claim 12, wherein the controller, while the fourth switch is in an on-state, is configured to count a time from a reception time of the start-off signal, and operate the fourth switch to be turned off when the counted time passes a second setting time.

16. The vehicle of claim 12, wherein the controller, in response to receiving a key-on signal, is configured to terminate the parking-video recording mode and execute a traveling-video recording mode, and operate the fourth switch to be turned on to supply electric power of the second battery to the video recording device.

17. The vehicle of claim 12, wherein the controller, while the fourth switch is in an on-state, is configured to terminate the parking-video recording mode when a charging amount of the second battery is less than or equal to a second reference charging amount.

18. A method of controlling a vehicle, comprising:
executing, by a controller, in response to receiving a start-off signal, a parking-video recording mode; and
executing, by the controller, in response to receiving a start-on signal, a traveling-video recording mode,
wherein the executing of the parking-video recording mode includes:
operating, by the controller, a first switch connected to a first battery to be turned on to supply electric power of the first battery to a video recording device;
identifying, by the controller, a charging amount of the first battery;
operating, by the controller, a third switch connected to a second battery to be turned on to supply electric power of the second battery to the video recording device when the identified charging amount of the first battery is less than a first reference charging amount;
identifying, by the controller, a charging amount of the second battery; and
terminating, by the controller, the parking-video recording mode when the identified charging amount of the second battery is less than a second reference charging amount,
wherein the executing of the traveling-video recording mode includes operating, by the controller, a second switch connected to a generator to be turned on to supply electric power generated by the generator to the video recording device.

19. The method of claim 18, wherein the executing of the parking-video recording mode includes:
counting, by the controller, while the first switch is in an on-state, a time from a reception time of the key-off signal, and operating the first switch to be turned off when the counted time passes a first setting time; and
counting, by the controller, while the third switch is in an on-state, a time from a reception time of the key-off signal, and operating the third switch to be turned off when the counted time passes a second setting time.

20. The method of claim 18, further comprising, in response to receiving the start-on signal, charging, by the controller, the first and second batteries using electric power generated by the generator.

* * * * *